(12) United States Patent
Sasao

(10) Patent No.: US 11,275,947 B2
(45) Date of Patent: Mar. 15, 2022

(54) IMAGE PROCESSING SYSTEM, IMAGE PROCESSING METHOD, AND IMAGE PROCESSING PROGRAM

(71) Applicant: Hitachi Kokusai Electric Inc., Tokyo (JP)

(72) Inventor: Hiroto Sasao, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 17/297,761

(22) PCT Filed: Dec. 19, 2018

(86) PCT No.: PCT/JP2018/046756
§ 371 (c)(1),
(2) Date: May 27, 2021

(87) PCT Pub. No.: WO2020/129176
PCT Pub. Date: Jun. 25, 2020

(65) Prior Publication Data
US 2022/0044020 A1   Feb. 10, 2022

(51) Int. Cl.
*G06K 9/00*  (2006.01)
*G06T 7/50*  (2017.01)
(Continued)

(52) U.S. Cl.
CPC ...... *G06K 9/00711* (2013.01); *G06K 9/00979* (2013.01); *G06K 9/2054* (2013.01);
(Continued)

(58) Field of Classification Search
CPC .......... G06K 9/00711; G06K 9/00979; G06K 9/2054; G06K 9/6256; G06N 3/04;
(Continued)

(56) References Cited

U.S. PATENT DOCUMENTS

| 2017/0017841 A1* | 1/2017 | Chen ..................... G06T 7/12 |
| 2018/0075602 A1* | 3/2018 | Shen ..................... G06T 7/62 |
| 2019/0156481 A1* | 5/2019 | Sekiguchi ............ G06T 7/0014 |

FOREIGN PATENT DOCUMENTS

| JP | H06-233761 A | 8/1994 |
| JP | 2003-168110 A | 6/2003 |

OTHER PUBLICATIONS

International Search Report and Written Opinion of the International Searching Authority dated Apr. 2, 2019, issued in counterpart International Application No. PCT/JP2018/046756, w/ English translation.

(Continued)

*Primary Examiner* — Ping Y Hsieh
(74) *Attorney, Agent, or Firm* — Bacon & Thomas, PLLC

(57) ABSTRACT

The present invention provides a technique suitable for the detection of small objects such as white canes.
In order to solve this problem, one representative example of this image processing system comprises a video acquisition unit configured to input an input image acquired as a video, an estimation unit including a Fully Convolutional Network (FCN) learning model trained with respect to a region of a predetermined detection target, and configured to generate a region estimation image for the detection target by processing the input image with the learning model, and an image processing unit configured to detect the region of the detection target based on the region estimation image.

14 Claims, 14 Drawing Sheets

(51) Int. Cl.
*G06K 9/62* (2022.01)
*G06K 9/20* (2006.01)
*G06N 3/04* (2006.01)
*G06T 7/70* (2017.01)
*G06Q 50/26* (2012.01)

(52) U.S. Cl.
CPC ............ *G06K 9/6256* (2013.01); *G06N 3/04* (2013.01); *G06T 7/50* (2017.01); *G06T 7/70* (2017.01); *G06Q 50/26* (2013.01); *G06T 2207/10016* (2013.01); *G06T 2207/20081* (2013.01); *G06T 2207/20084* (2013.01)

(58) Field of Classification Search
CPC ... G06T 7/50; G06T 7/70; G06T 2207/10016; G06T 2207/20081; G06T 2207/20084; G06Q 50/26
See application file for complete search history.

(56) References Cited

OTHER PUBLICATIONS

Written Opinion of the International Preliminary Examining Authority dated Jun. 23, 2020 and International Preliminary Report on Patentability dated Aug. 20, 2020, issued in counterpart International Application No. PCT/JP2018/046756, w/ English translation.
Long, Jonathan et al.; Fully Convolutional Networks for Semantic Segmentation, the IEEE Conference on Computer Vision and Pattern Recognition, [online], May 2015, pp. 3431-3440.
Dai, Jifeng et al.; R-FCN: Object Detection via Region-based Fully Convolutional Networks, Advances in Neural Information Processing Systems 29, [online], 2016, pp. 379-387.
Deep Learning for Outputting Multiple Classifications, [online], [Search Nov. 1, 2018], Internet <URL: https://qiita.com/cvusk/items/1439c1c6dde160c48d13>.

* cited by examiner

FIG. 11
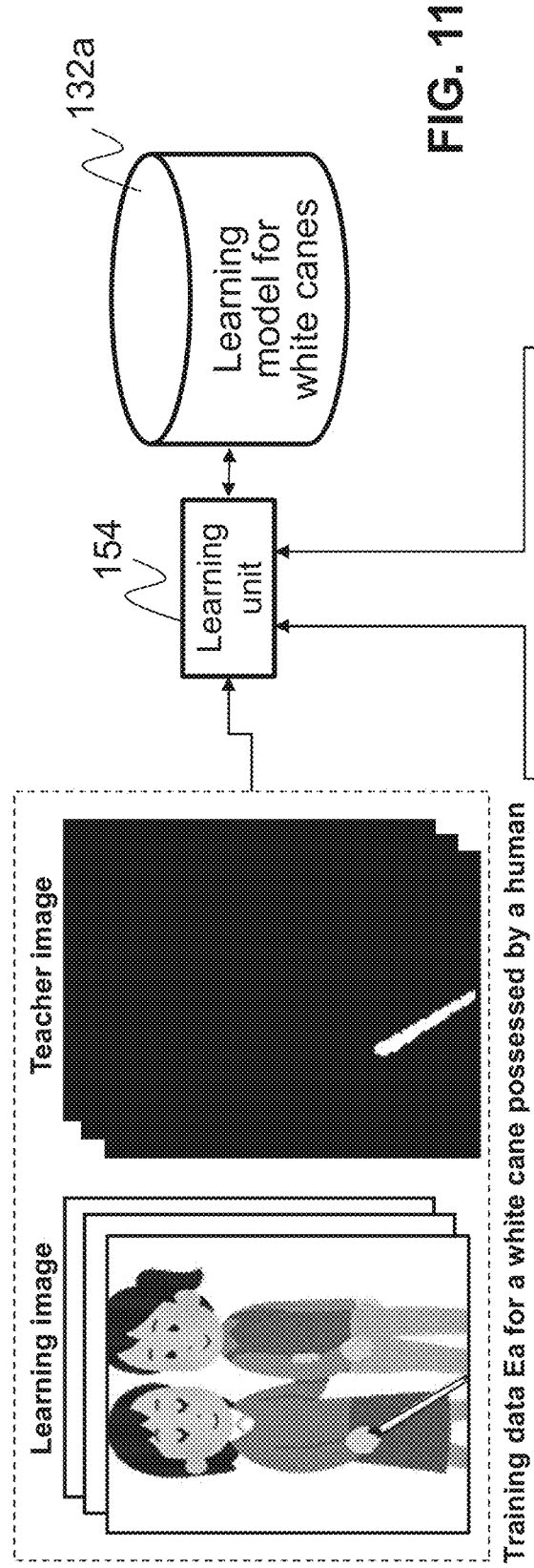
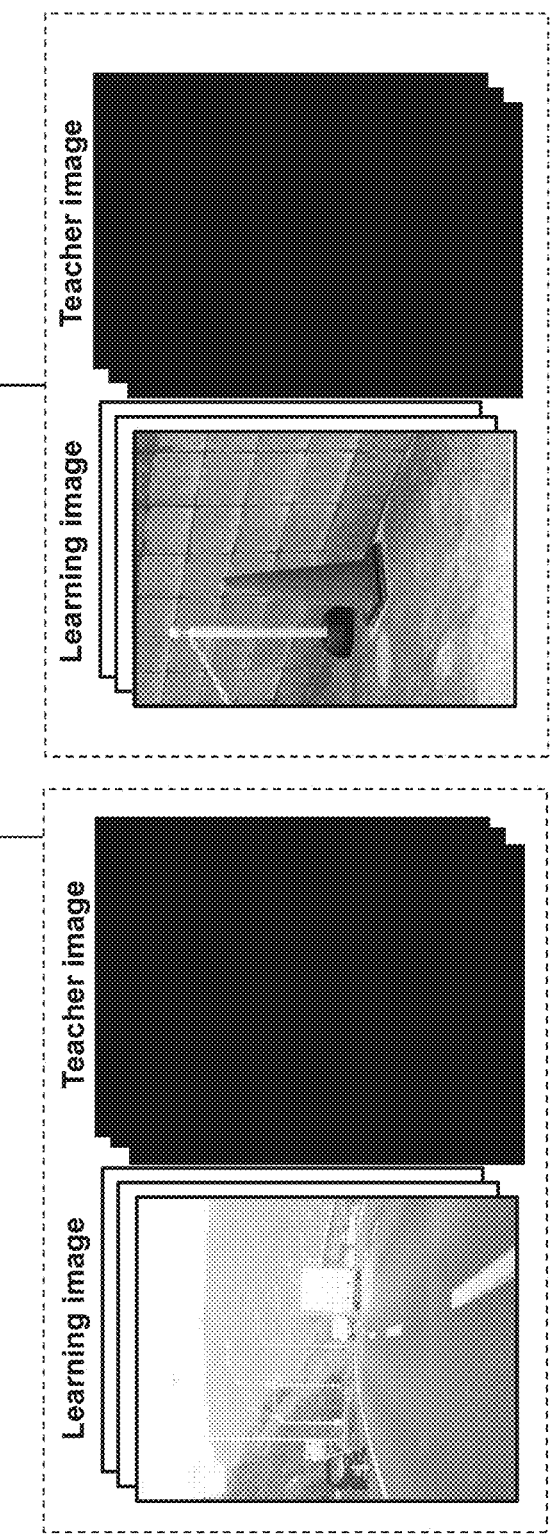

FIG. 12
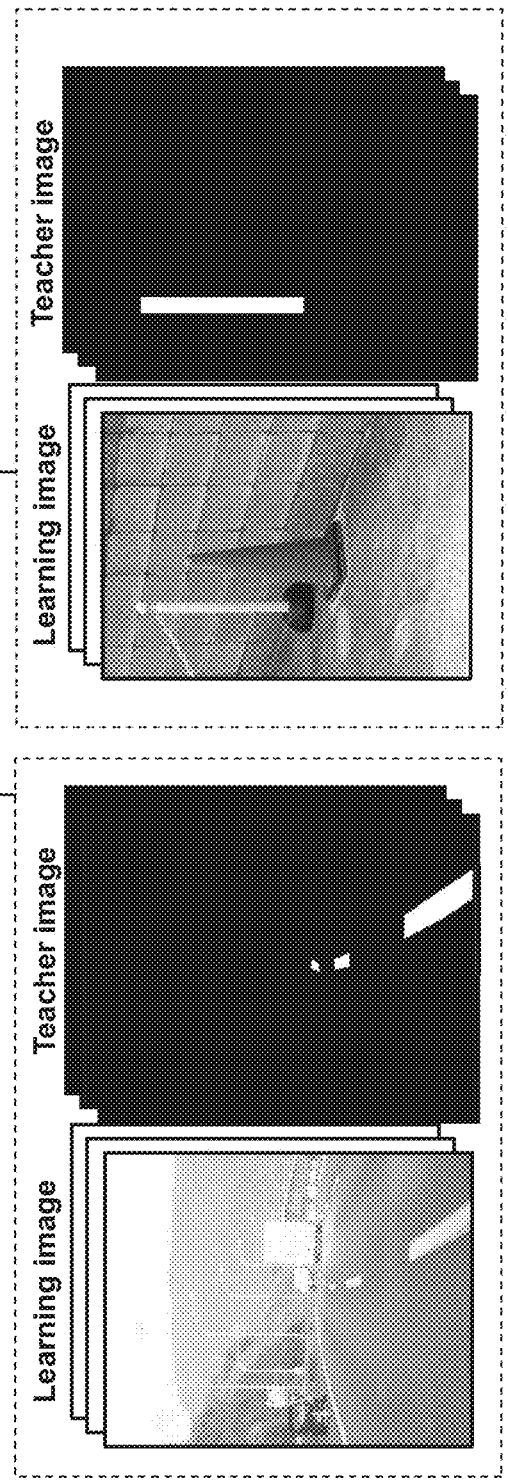
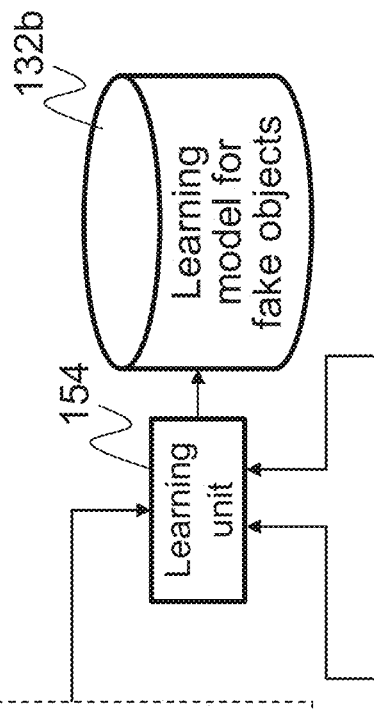
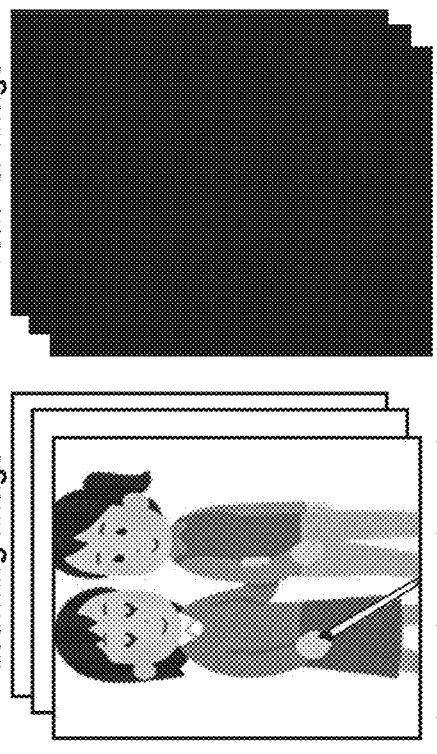

IMAGE PROCESSING SYSTEM, IMAGE PROCESSING METHOD, AND IMAGE PROCESSING PROGRAM

TECHNICAL FIELD

The present invention relates to an image processing system, an image processing method, and an image processing program.

BACKGROUND OF THE INVENTION

Conventionally, techniques are known for automatically detecting a detection target by image processing captured images from surveillance cameras. This type of image processing is effective in reducing the monitoring load of humans.

For example, Patent Document 1 discloses, as a technique for automatically detecting a visually impaired person possessing a white cane, image processing for "acquiring video data of one frame, detecting and connecting pixel values of a color range of a white cane based on edge positions of the video data, and determining whether or not a collection of connected pixels has a feature of the shape of a white cane."

In addition, Non-Patent Document 1 discloses a technique of using a convolutional neural network CNN (convolutional layer+pooling layer+fully connected layer) trained to attach labels of a first label (a dog, a cat, or the like) and a second label (an artificial object, a natural object, or the like) with respect to an image, and classifying a main subject in an image with a plurality of labels (such as dog and natural object). With this technique of Non-Patent Document 1, high classification accuracy can be obtained for a main subject that occupies a large part of an image.

CITATION LIST

Patent Documents

[Patent Document 1] Japanese Unexamined Patent Application Publication No. 2003-168110

Non-Patent Documents

[Non-Patent Document 1] Deep Learning for Outputting Multiple Classifications, [online], [Search Nov. 1, 2018], Internet <URL: https://giita.com/cvusk/items/1439c1c6dde160c48d13>

SUMMARY OF INVENTION

Technical Problem

In the technique of Patent Document 1, a region of a white cane is detected from an input image using only image processing. However, there is a problem that, when the region of the input image occupied by the white cane is small, the detection accuracy tends to be low.

Further, in the convolutional neural network CNN of Non-Patent Document 1, when a small subject coexists with the main subject, there is a problem that it becomes difficult to classify the small subject.

For example, consider a convolutional neural network CNN for distinguishing between a "person with a white cane" and a "person without a white cane" to automatically detect visually impaired persons. In this case, it is necessary to identify the presence or absence of a white cane.

However, relative to the person to be identified, the white cane to be identified is very thin and has poor features. Thus, in contrast to the many neurons that are susceptible to activation by human features, the small number of neurons that react to inconspicuous white canes are easily confused, making it difficult to classify between "people with white canes" and "people without white canes."

Accordingly, it is an object of the present invention to provide a technique suitable for detecting small detection targets (such as white canes).

Means for Solving the Problems

In order to solve the above-mentioned problems, one representative example of this image processing system comprises a video acquisition unit configured to input an input image acquired as a video; an estimation unit including a Fully Convolutional Network (FCN) learning model trained with respect to a region of a predetermined detection target, and configured to generate a region estimation image for the detection target by processing the input image with the learning model; and an image processing unit configured to detect the region of the detection target based on the region estimation image.

Effect of the Invention

According to the present invention, small detection targets can be appropriately detected.

Other problems, configurations and effects other than those described above will be made clear by the following description of the embodiments.

BRIEF DESCRIPTION OF DRAWINGS

FIG. 11 is a diagram for explaining the training data of the second embodiment.

FIG. 12 is a diagram for explaining the training data of the third embodiment.

DESCRIPTION OF EMBODIMENT(S)

The embodiments according to the present invention will be described with reference to the accompanying drawings.

First Embodiment

Configuration of the First Embodiment

The first embodiment is an image processing system 100 for detecting, for example, (a visually impaired person possessing) a white cane.

Figure 1:
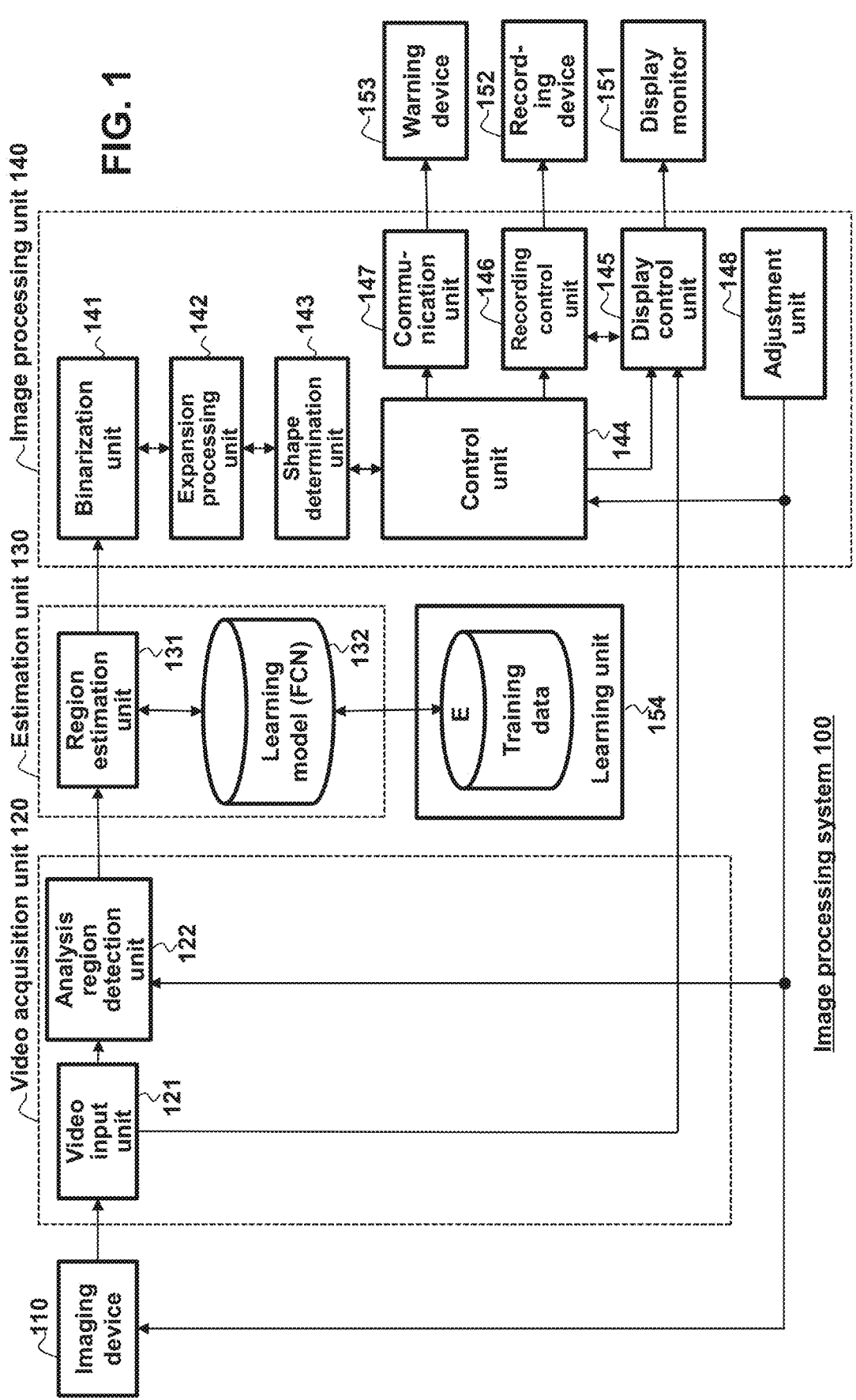
FIG. 1 is a diagram illustrating a configuration of an image processing system 100.

FIG. 1 is a diagram illustrating a configuration of the image processing system 100.

In this figure, the image processing system 100 is configured as an information processing system (an information processing device) including a CPU (Central Processing Unit), a memory, and the like as hardware. When this hardware executes an image processing program, the various functions described later can be realized. Part or all of the hardware may be replaced by a Digital Signal Processor (DSP), a Field-Programmable Gate Array (FPGA), a Graphics Processing Unit (GPU), or the like. In addition, some or all of the hardware may be centralized or distributed on a network.

The image processing system 100 includes an imaging device 110, a video acquisition unit 120, an estimation unit 130, an image processing unit 140, a display monitor 151, a recording device 152, a warning device 153, and a learning unit 154.

The imaging device 110 is composed of one or more cameras. This type of imaging device 110 may be disposed in a monitoring location as a monitoring camera, mounted on a human body as a wearable camera, disposed on a moving body such as a vehicle as an on-board camera, disposed on a machine such as a construction machine or a robot, or utilized in other various applications.

The video acquisition unit 120 includes a video input unit 121 and an analysis region designation unit 122. The video input unit 121 acquires, in a wired or wireless fashion, an image including a moving image or a still image from the imaging device 110 or an external input. The analysis region designation unit 122 manually or automatically determines an image range for monitoring of the white cane (the detection target) of the acquired image, and stores the image range of the acquired image into an internal memory (not illustrated in the Figures). The image of the image range to be monitored (hereinafter referred to as an "input image") is set as the entirety or a portion of the acquired image, in consideration of the image range to be monitored and reduction of the processing load.

The estimation unit 130 includes region estimation unit 131 and a Fully Convolutional Network (FCN) learning model 132. The region estimation unit 131 estimates the region of the white cane (the detection target) in the image by processing the input image with the learning model 132, and generates a region estimation image. Here, the region estimation image is an image in which the essence of the detection target learned by the learning model is represented by a plurality of gradation values and colors, in pixel units or region units.

The image processing unit 140 includes a binarization unit 141, an expansion processing unit 142, a shape determination unit 143, a control unit 144, a display control unit 145, a recording control unit 146, a communication unit 147, and an adjustment unit 148.

Next, the learning model 132 will be described.

Figure 2:
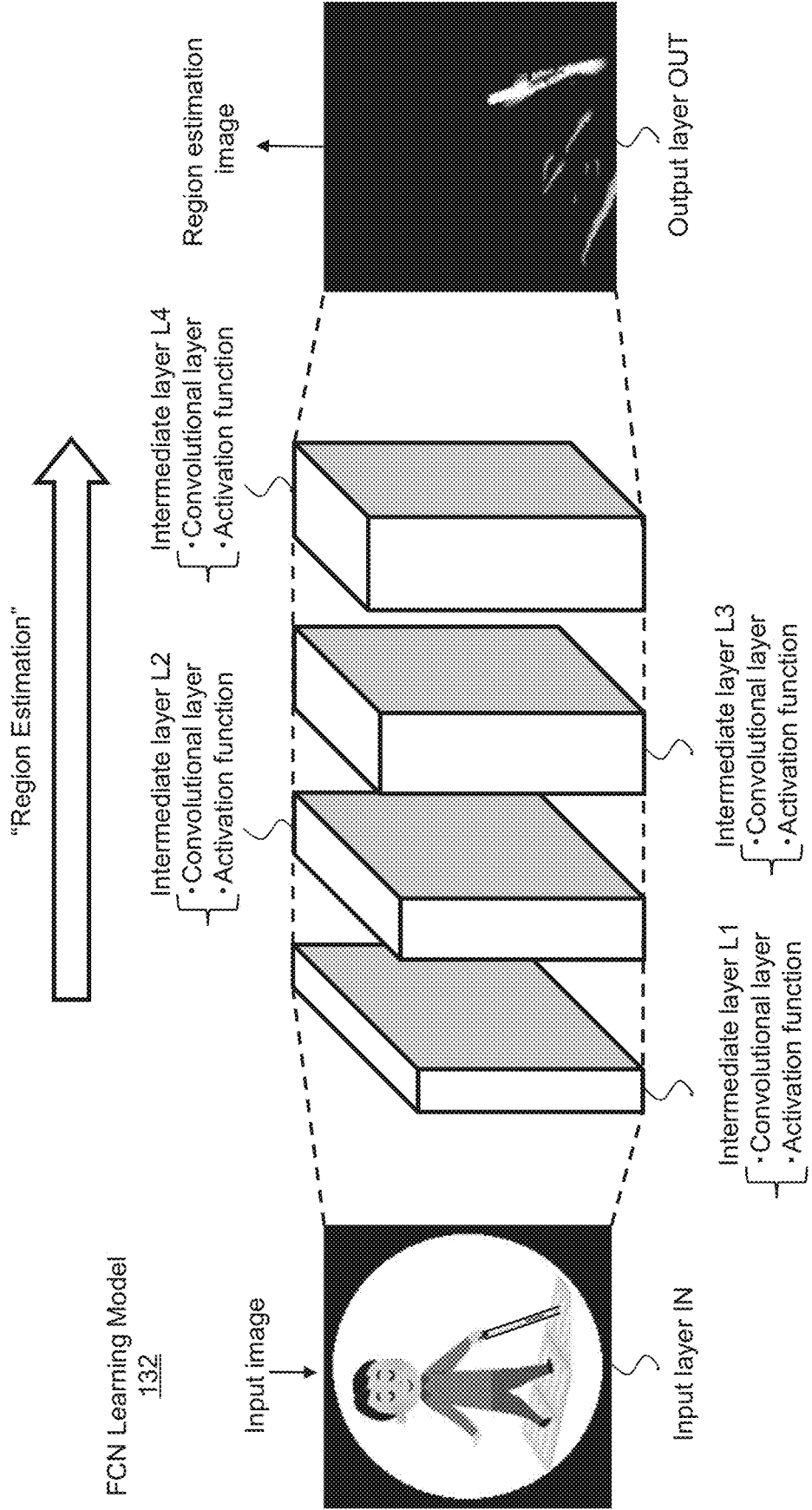
FIG. 2 is a diagram for explaining a configuration of a learning model 132.

FIG. 2 is a diagram for explaining the configuration of the learning model 132.

In this figure, the learning model 132 includes an input layer IN to which an input image is input, a plurality of intermediate layers L1 to L4, and an output layer OUT for outputting a region estimation image.

The plurality of intermediate layers L1 to L4 include, as one layer, at least a convolutional layer for images (feature maps), and all the layers are connected to each other to form a Fully Convolutional Network (FCN).

The number of layers of the intermediate layers L1 to L4 is preferably around 4 for estimating the region of a white cane. It should be noted that the number of layers of the intermediate layers changes according to the size of the detection target, the amount of features, the complexity, the difficulty, the computational load, or the like.

In the output layer, a white cane region estimation image (the detection target) is generated by performing weighted addition and logical operations (including maximum value operations and minimum value operations) as they are with respect to multi-channel images (feature maps) processed stepwise in the intermediate layers L1 to L4.

Figure 3:
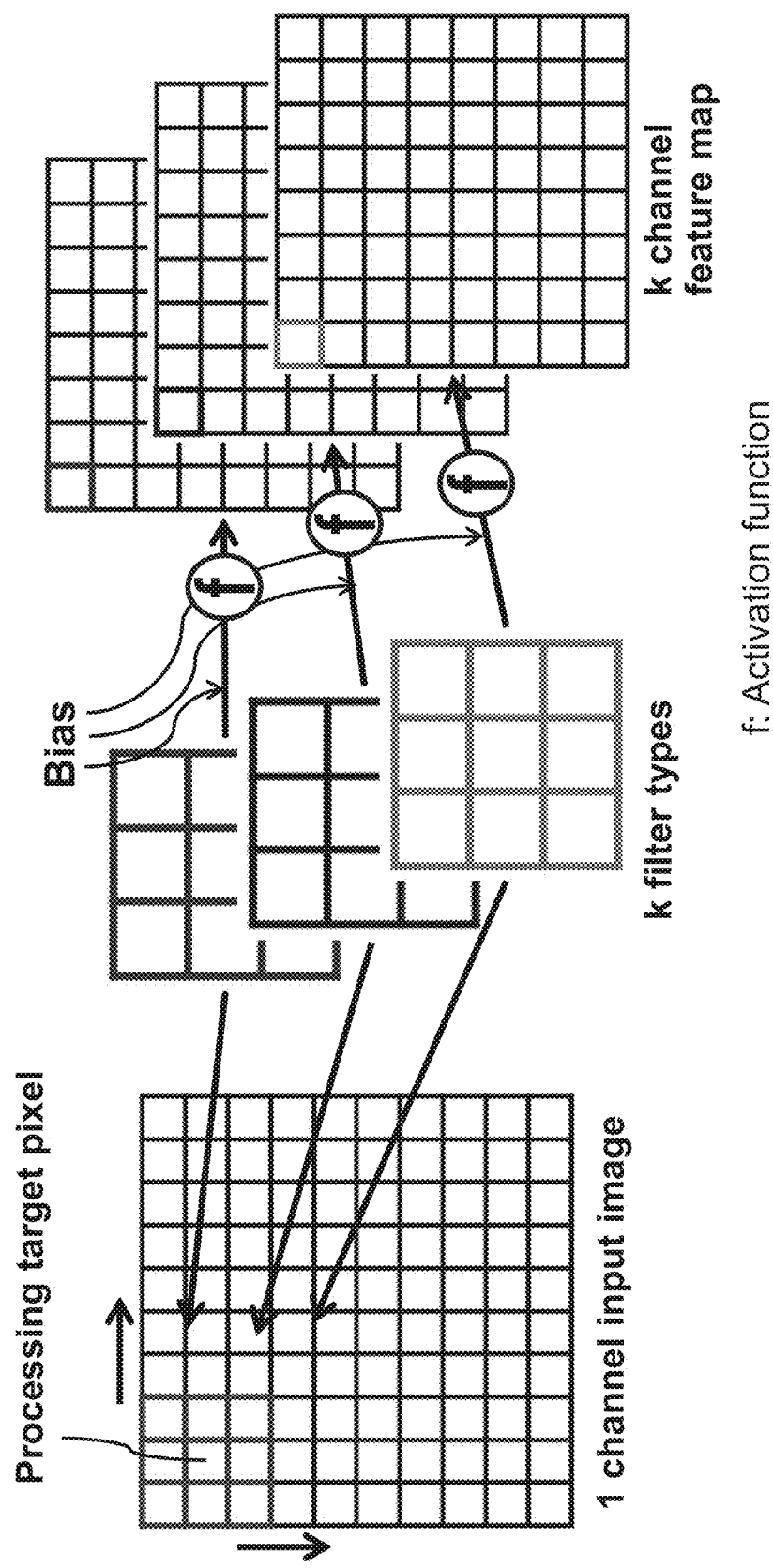
FIG. 3 is a diagram for explaining the configuration of one intermediate layer.

FIG. 3 is a diagram for explaining the configuration of one intermediate layer of the learning model 132.

In this figure, an image of one input channel is input from the input layer IN or the preceding intermediate layer.

With the processing target pixel of the image at the center, convolutional values are generated by multiplying the local area by the filter coefficient of n rows×m columns, and then obtaining the local sum (processing of the convolutional layers using a product-sum calculation).

At this time, by performing padding before the convolution process (processing for enlarging the upper, lower, left, and right sides of the image by several pixels with fixed values or the like), missing pixels of the upper, lower, left, and right sides of the image in the product-sum operation can be avoided.

A bias is added to or subtracted from the convolutional values. The convolutional values to which the bias has been added or subtracted are processed by a nonlinear activation function. The activation function is a nonlinear function that simulates a neuronal characteristic of changing nonlinearly from a non-active region to an active region with a value corresponding to a predetermined bias as a boundary.

By performing such nonlinear image processing while scanning horizontally and vertically, a feature map in which each individual pixel is made into a neuron is generated. The horizontal and vertical scan interval (stride) is set from one pixel to several pixels.

It should be noted that, in the detection of white canes, since a white cane held by a human is thin in the lateral width direction (the horizontal direction of the image) and features are easily lost, it is preferable to make the scanning interval in the horizontal direction dense (for example, one pixel unit).

The feature map thus generated is output to the next intermediate layer or output layer OUT.

It should be noted that, as illustrated in FIG. 3, when k types of combinations of filter coefficients and biases are provided, a characteristic map of k channels is generated from an image of one channel (where k is a natural number).

Next, referring to FIG. 4, the processing for one intermediate layer in which multiple channels (three channels are illustrated in the figure) are input will be described.

These multiple channels are channels of the color components of the color image input to the input layer IN (such as RGB or YCbCr), or the k channels of the feature map input from the previous intermediate layer.

Figure 4:
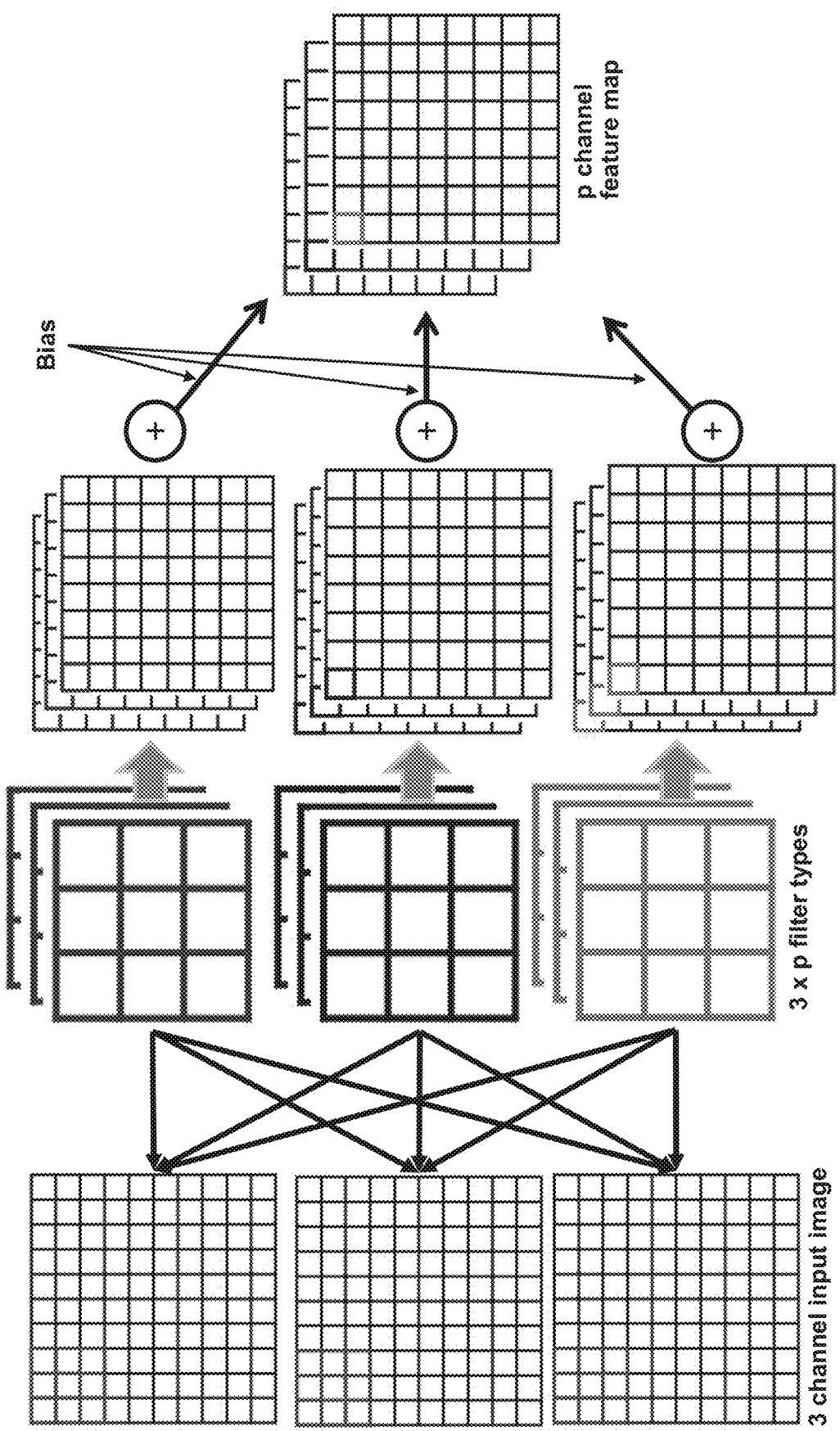
FIG. 4 is a diagram for explaining the configuration of one intermediate layer.

In each of the multi-channel images, the processing of the convolutional layers and the activation function are performed in a cross-sectional manner as illustrated in FIG. 4, and p groups of feature maps (where p is a natural number) are generated. Weighted addition, a pixel logical operation (including a maximum value operation or a minimum value operation), a bias addition, or the like are performed for each p group of these feature maps, and a p channel feature map is output.

Figure 5:
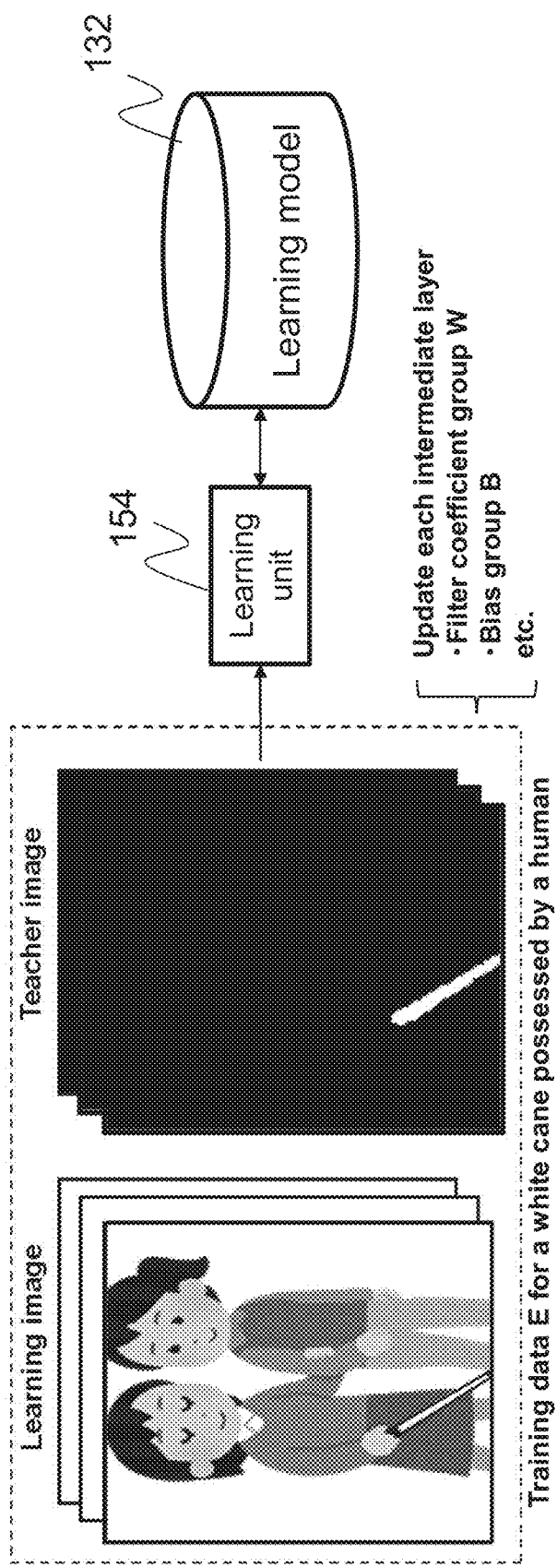
FIG. 5 is a diagram for explaining the training data of the first embodiment.

FIG. 5 is a diagram illustrating a learning process of the learning model 132 by the learning unit 154.

In this figure, the learning unit 154 has training data E collected in advance. This training data E is a group of data sets in which "a learning image in which a human possesses a white cane" and "a teacher image in which a white cane of the learning image is set to a first pixel value (for example, white) and a remainder is set to a second pixel value (for example, black)" are grouped as one set.

In the learning model 132 prior to training, the filter coefficient group W and the bias group B of each intermediate layer are set to appropriate initial values. In this state, the learning unit 154 sequentially inputs the learning images of the training data E to the learning model 132, and sequentially obtains provisional region estimation images. The learning unit 154 obtains a pixel error between the teacher image of the training data E and the provisional region estimation image.

The learning unit 154 updates the values such as the filter coefficient group W and the bias group B of each intermediate layer using a back error propagation method or the like in a direction such that the obtained pixel error decreases.

Every time this update operation is repeated for units of a predetermined set of training data E, the values of the filter coefficient group W and the bias group B of each intermediate layer are gradually optimized.

The learning unit 154 does not use all of the training data E for update processing (training) of the filter coefficient group W and the bias group B, and uses a portion of the training data E to confirm the effect of the training.

The learning unit 154 completes the repetitive training of the learning model 132 when it is determined that the effect confirmation of this training is sufficient (for example, when the sum of the magnitudes of the pixel errors is equal to or less than an allowable value).

By means of the above-described training process, a learning model 132 that outputs "a region estimation image (a multi-gradation image) in which the white cane of the input image is set to a value relatively close to the first pixel value (for example, white) and the remainder is set to a value relatively close to the second pixel value (for example, black)" is obtained for "an input image in which a human possesses a white cane."

Operation of the First Embodiment

Figure 6:
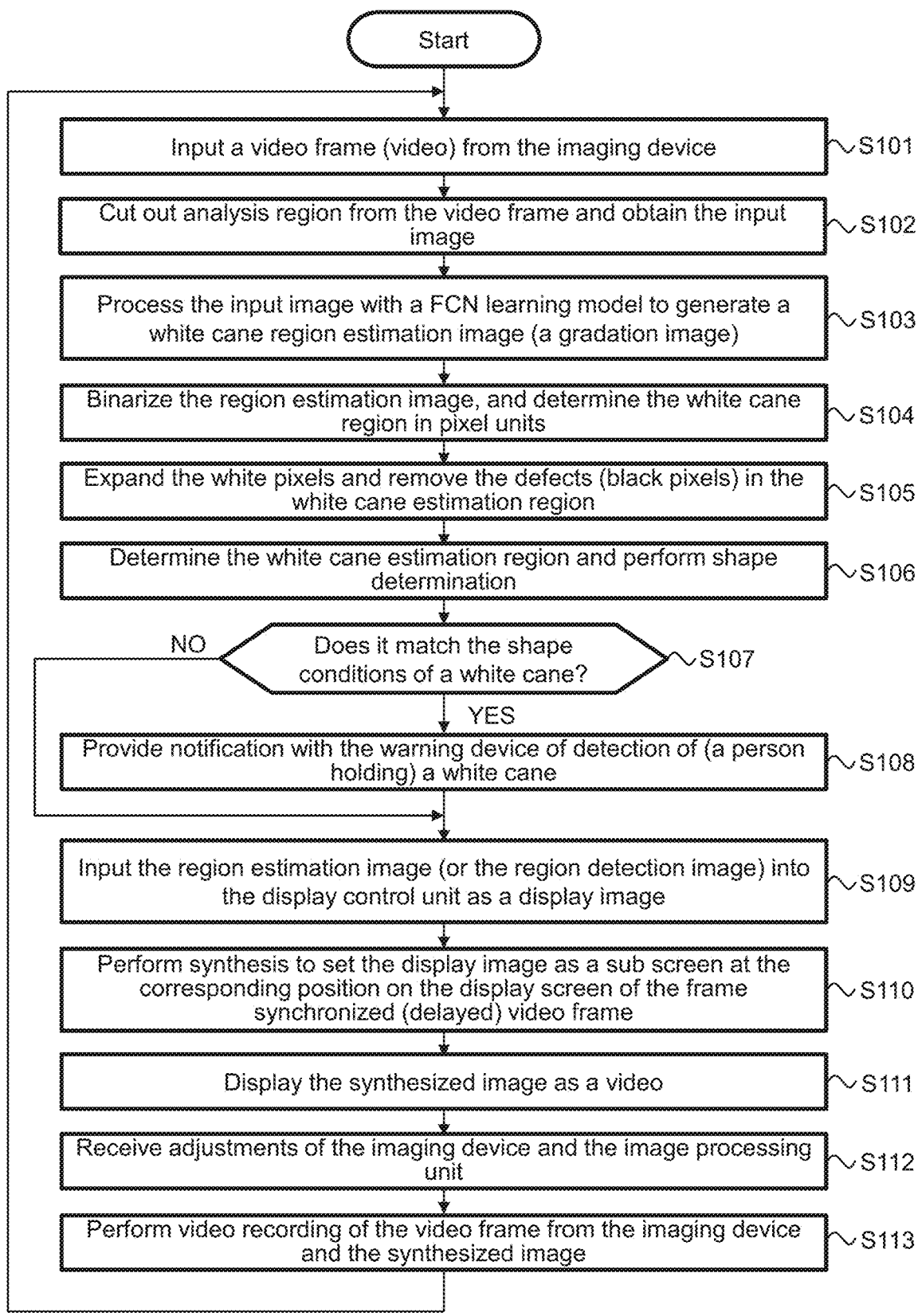
FIG. 6 is a flow diagram for explaining the operation of the white cane detection.

FIG. 6 is a flowchart for explaining a white cane detection operation by the image processing system 100.

Hereinafter, white cane detection will be described in accordance with the step numbers illustrated in the figures.

Step S101: The video input unit 121 captures video frames that are video captured by the imaging device 110 in real time, for example. Instead of the imaging device 110, video frames reproduced from a video recording apparatus or video frames transmitted through a network may be input.

These videos are organized into pixel matrix data consisting of one or a plurality of dimensions in accordance with the matrix calculation in the learning model 132.

In order to reduce the influence of noise, flicker, or the like included in the video, spatial processing such as a smoothing filter, a contour enhancement filter, density conversion, or the like may be performed as preprocessing.

In addition, a data format such as RGB color, YUV, monochrome, or the like may be selected according to the application. Further, in order to reduce the calculation load, the image data may be subjected to reduction processing.

Figure 7:
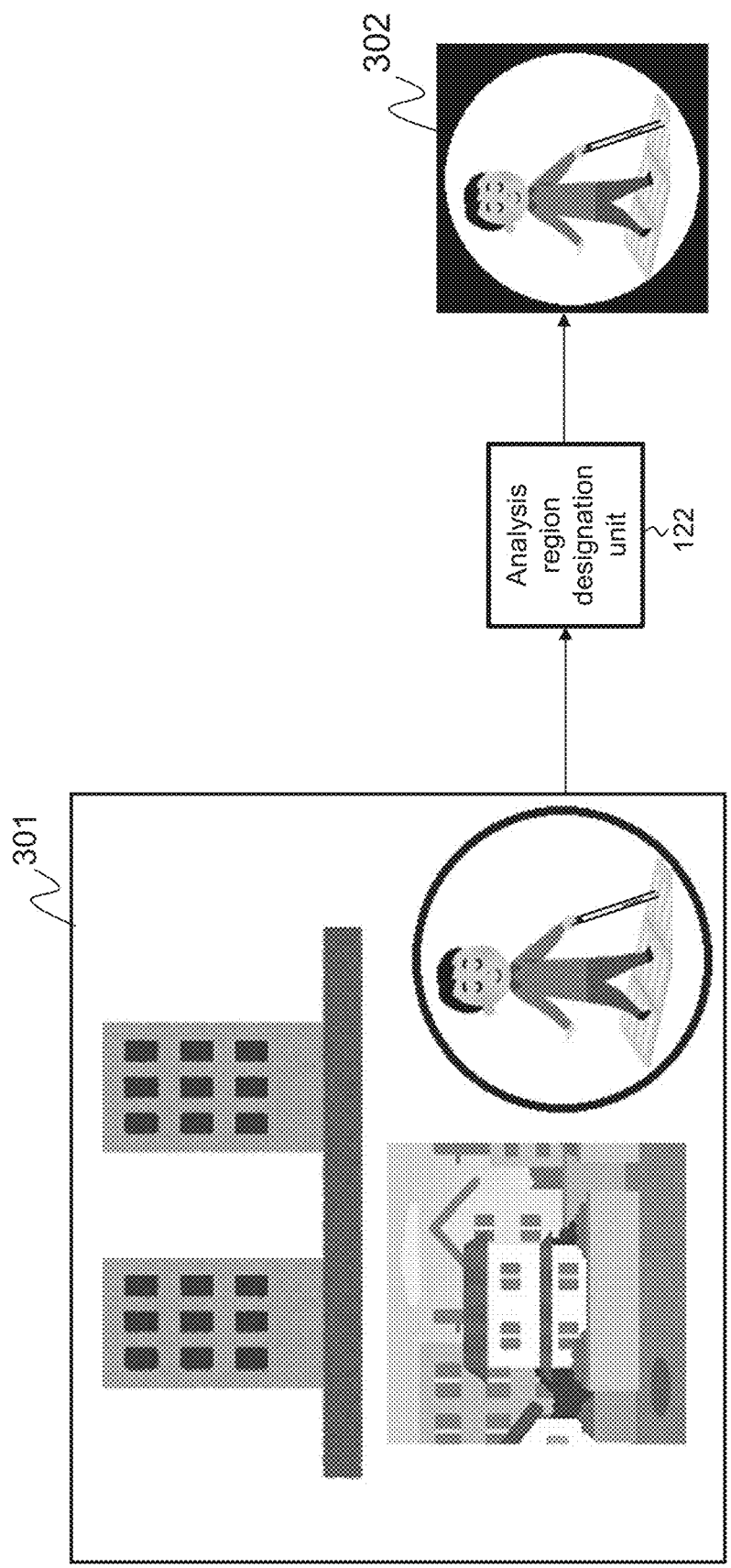
FIG. 7 is a diagram for explaining the operation of the video acquisition unit.

Step S102: As illustrated in FIG. 7, the analysis region designation unit 122 cuts out all or a partial region of the video frame 301, and cuts out an input image 302 having an image range in which a white cane is to be detected. The region to be cut out may be a region which is masked by a rectangle, a circle or an ellipse, and may be filled with a predetermined pixel value when a margin occurs in the region.

Figure 8:
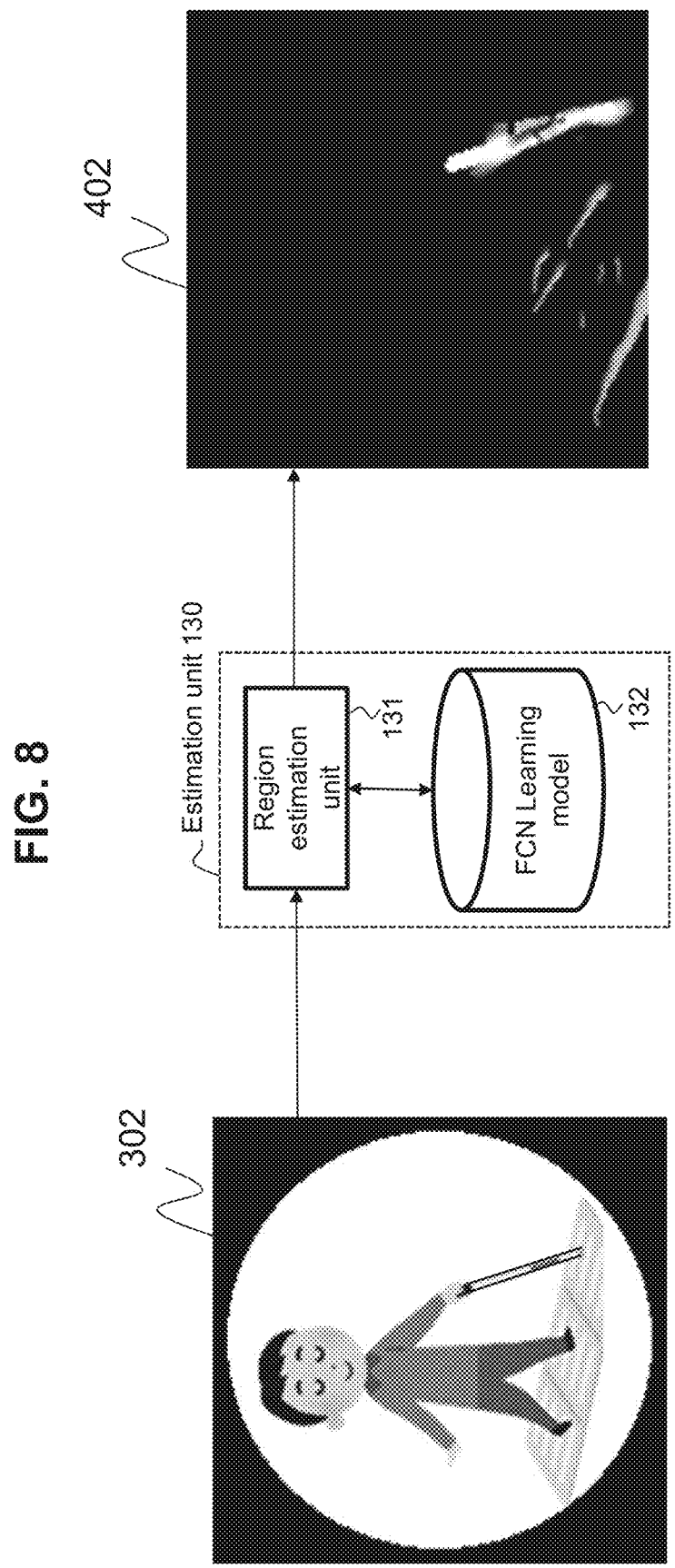
FIG. 8 is a diagram for explaining the operation of the estimation unit.

Step S103: As illustrated in FIG. 8, the region estimation unit 131 inputs the input image 302 to the input layer IN of the learning model 132. The learning model 132 sequentially processes the input image 302 in the internal intermediate layers, and outputs a white cane region estimation image 402 to the output layer OUT.

Figure 9:
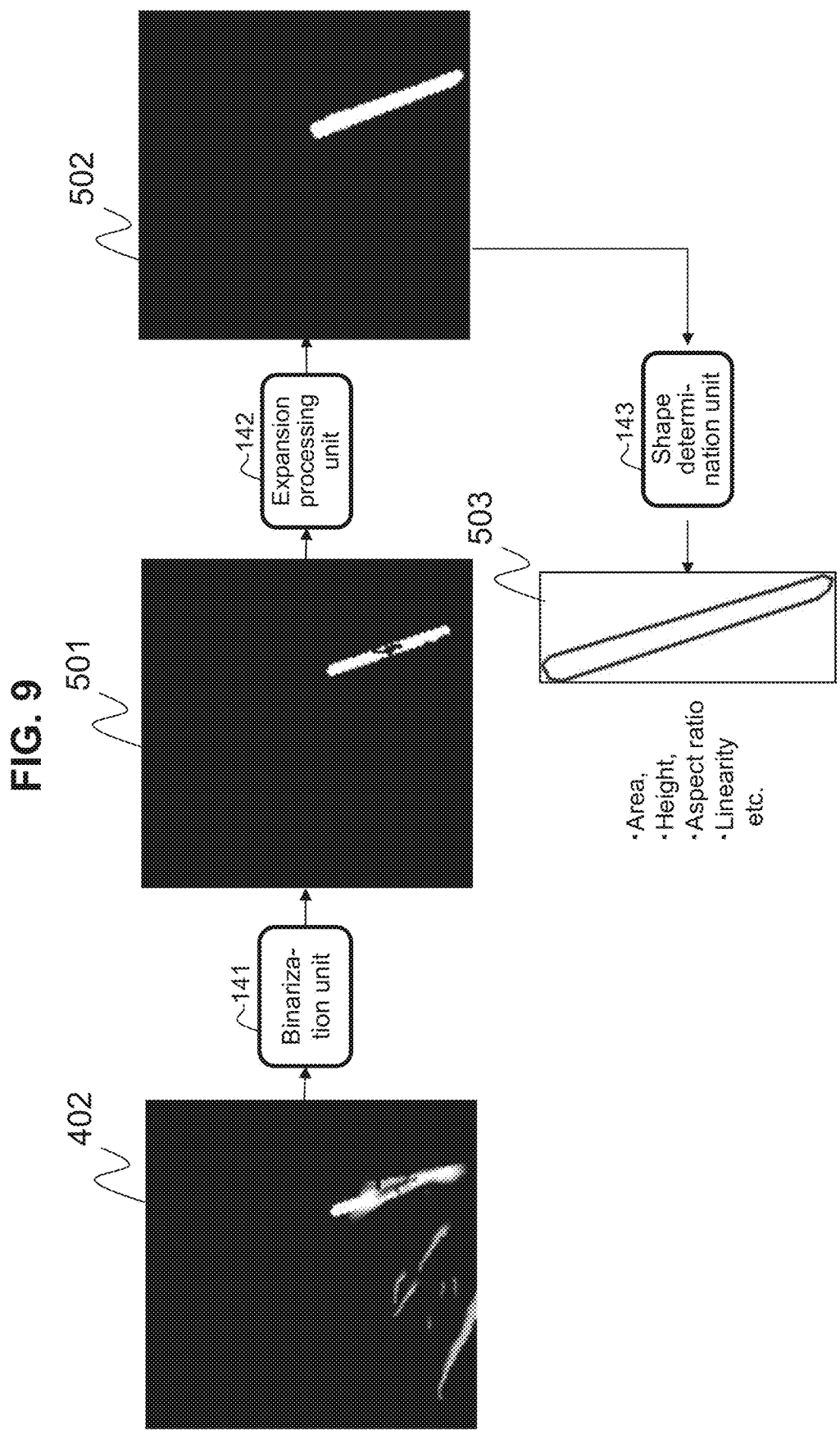
FIG. 9 is a diagram for explaining the operation of the image processing unit.

Step S104: FIG. 9 is a diagram illustrating image processing with respect to the region estimation image 402.

In this figure, the binarization unit 141 performs binarization processing on the region estimation image 402 to generate a binarized image 501. The binarized image 501 is an image in which a region close to the first pixel value estimated to be a region of the white cane is set as white, and the remainder is set as a black background color.

The threshold value of this binarization processing may be determined in advance by experimentation, or may be automatically determined by binarization of Otsu or the like.

Step S105: The expansion processing unit 142 performs, with respect to the binarized image 501, an expansion process in which one pixel to several pixels around a white pixel are filled with white, and outputs a region detection image 502.

In the estimation region of the white cane, black pixels may be mixed in as defects. In the expansion process, black pixels mixed in within the region of the white pixel are filled by the expanded white pixels, and the black pixel defects can be removed.

The number and expansion width (the size of the filter) of the expansion process here is appropriately set based on the occurrence frequency of the black pixels. It should be noted that the reduction process may be performed on the white pixels before or after the expansion process.

Step S106: The shape determination unit 143 extracts the white pixel region from the region detection image 502 and performs the following shape determination for the white pixel region.

Determination of whether the area of the white pixel region (the number of pixels) conforms to the allowable range of the area of the white cane.

Determination of whether the height, width, and aspect ratio of the white pixel region (the smallest rectangle surrounding it) conform to the allowable range of the height, width, and aspect ratio of the white cane (the smallest rectangle surrounding it).

Determination of whether the maximum width, the minimum width, and the flatness ratio of the white pixel area is compatible with the allowable range of the maximum width, the minimum width, and the flatness ratio of the white cane.

Determination of whether the length of the maximum straight line included in the white pixel region is compatible with the allowable range of the length of the straight line of the white cane on the screen.

Step S107: The control unit 144 determines that a white cane has been detected when all or a portion of the shape determinations of Step S106 are matched, and shifts the operation to Step S108. Otherwise (the shape determinations are not matched), the shape determination unit 143 shifts the operation to Step S109.

In this way, the image processing unit 140 determines the detection or absence of the white cane serving as the detection target based on the region estimation image 402. In other words, the image processing unit 140 determines the presence or absence of the detection target based on all or some of the area, shape, and length of a region having the pixel value estimated to be the detection target in the region estimation image 402.

Step S108: The communication unit 147 transmits the detection of the white cane (the detection of the visually impaired person with the white cane) to the warning device 153. After receiving the transmission, the warning device 153 performs notification by sound, light, or the like. When an attendant becomes aware of this notification, appropriate support such as guidance and safety considerations for the visually impaired person are provided.

In addition, the communication unit 147 may centralize monitoring operations at a plurality of locations by notifying a monitoring center on the network of detection of (a visually impaired person possessing) a white cane.

Step S109: The display control unit 145 displays all or a portion of the region estimation image 402 (or the region detection image 502) on the display screen and performs highlighted display indicating that a white cane has been detected. For example, the display control unit 145 may cut out a predetermined shape range (a rectangle, ellipse, or the like) including a region estimated (determined) to be a white cane from the region estimation image 402 (or the region detection image 502), display the border of the predetermined shape range, or display the border of the region estimation image 402 (or the region detection image 502) with a modified color, line type, or the like.

Step S110: The display control unit 145 sequentially inputs video frames 301 from the video input unit 121.

Figure 10:
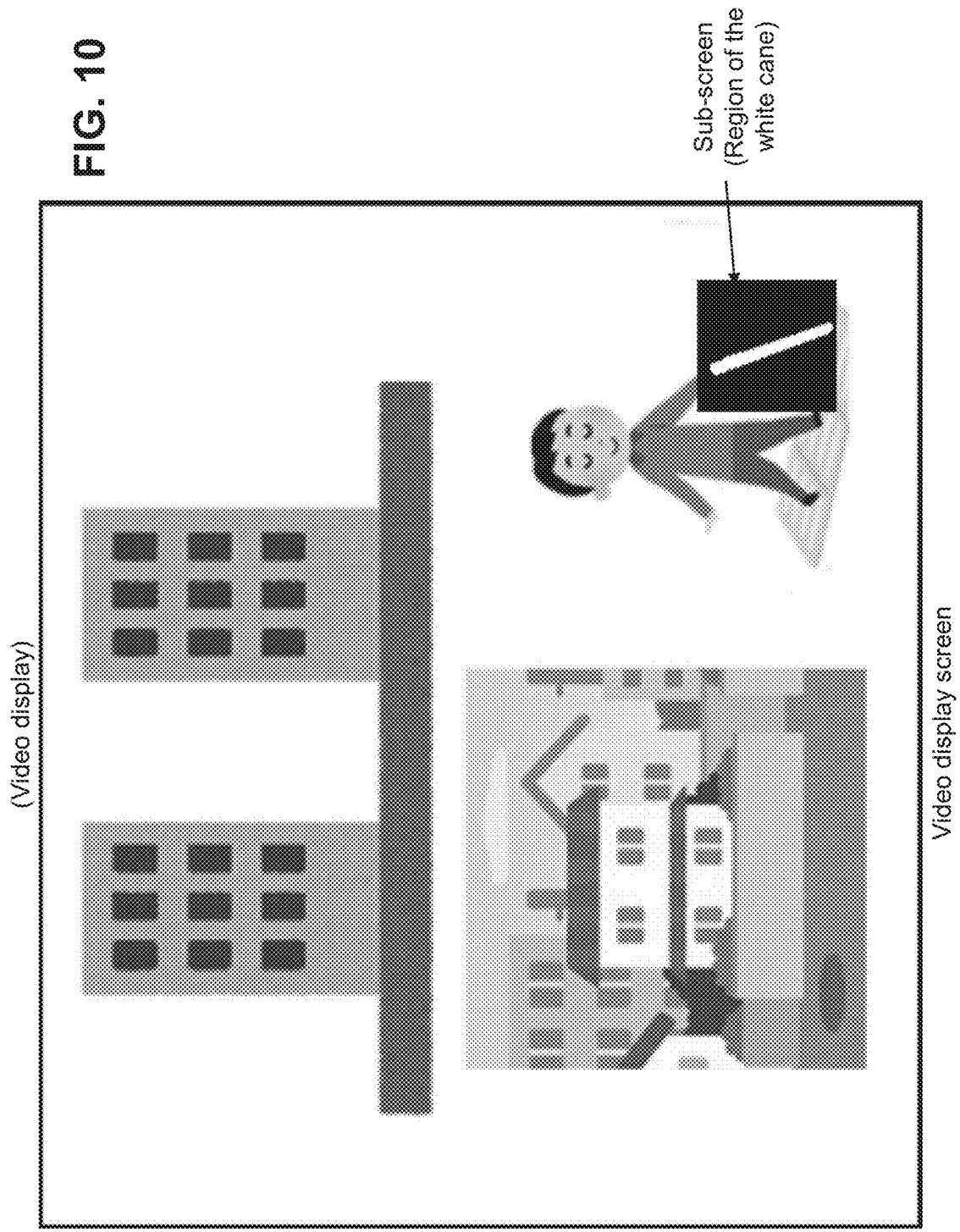
FIG. 10 is a diagram for explaining the operation of the display control unit.

The display control unit 145 adjusts the time lag between the video frames and the display image by delaying the video frame 301 via an internal First In First Out FIFO) or a frame memory. The display control unit 145 sequentially synthesizes the display images as sub-screens at the corresponding locations of the display screen of the time-adjusted video frames. FIG. 10 illustrates a display screen synthesized in this manner.

Step S111: The display control unit 145 displays the sequentially synthesized display screens on the display monitor 151.

Step S112: The person in charge of adjustment or management of the image processing system 100 can adjust the following items by operating the adjustment unit 148 while referring to the display screen displayed as a moving image in Step S111 (see FIG. 10).

Adjustment items of the imaging device 110 (image capture range, image capture zoom amount, image capture frame rate, electronic shutter time, aperture value, imaging sensitivity, gamma adjustment, switching to infrared image capture based on dark places or time, saturation adjustment, white balance, noise removal, outline enhancement, or the like).

Adjustment items of the analysis region designation unit 122 (such as the cut-out range and a mask range of a video frame)

Adjustment items of the image processing unit 140 (binarization threshold setting, systematic width of the binarization threshold, expansion width, items for shape determination, allowable range, or the like).

These adjustments by the adjustment unit 148 are quickly reflected on the display screen (see FIG. 10). In this way, the person in charge can immediately confirm the state of the adjustment on the display screen while performing adjustments, such that the white cane detection can be performed appropriately.

Step S113: The recording control unit 146 associates the video frame acquired in Step S101 with the image synthesized in Step S110 (see FIG. 10) and records the moving image in the recording device 152.

The recording control unit 146 may continuously perform the moving image recording (overwriting the moving image recording after a predetermined time has elapsed) or may record only the time period during which a white cane is detected. In addition, the recording control unit 146 may control the compression ratio and the recording interval of the moving image recording.

The video recorded in this manner is used not only for later confirmation, but also for manual or automatic creation of training data.

After the above-described operations (Steps S101 to 113), the image processing system 100 returns the operation to Step S101 to repeat the detection operation of the white cane. It should be noted that Step S112 may not be performed when the image processing system 100 is in operation.

Effect of the First Embodiment (1) In the first embodiment, the learning model 132 is composed by a Fully Convolutional Network (FCN). As illustrated in FIG. 2 to FIG. 3, the learning model 132 of this FCN is composed of convolutional layers in which all the intermediate layers are able to pass spatial features, such as pixel units of an image, to the next stage. For this reason, it becomes possible to maintain spatial features such as pixel units up to the final stage even for small and thin detection targets such as white canes. Accordingly, even small detection targets in images can be suitably detected.

(2) Incidentally, in the convolutional neural network CNN of Non-Patent Document 1, all the neurons are comprehensively coupled in the fully connected layer while ignoring the spatial features of the image. For this reason, in contrast to the large number of neurons that are activated by the features of large subjects (such as humans), the small number of neurons activated by small detection targets (such as a white cane in this case) are easily confused when they enter the fully connected layer. Accordingly, in the convolutional neural network CNN of Non-Patent Document 1, it is difficult to detect small subjects (such as white canes) that coexist with large subjects (such as humans).

In contrast, in the first embodiment, all of the intermediate layers are comprised of convolutional layers that pass spatial features, such as pixel units of an image, to the next stage. Accordingly, even if a large subject (such as a human) and a small detection target (such as a white cane) coexist, it becomes possible to process both while they coexist relatively in the image space. For this reason, even if large subjects coexist, small detection targets can be appropriately processed without being missed. As a result, detection and identification can be performed regardless of the size of the detection target with respect to the input image size.

(3) In the first embodiment, binarization processing is performed on the multi-gradation region estimation image generated by the learning model 132. In the learning model 132, a minute level of background noise that is not estimated to be the detection target is generated. The binarization process can appropriately reduce this minute level of background noise. Accordingly, a small detection object such as a white cane can be more suitably detected.

(4) In the first embodiment, an expansion process is performed on the region estimation image generated by the learning model 132. In the region estimation image, defect noise may be generated inside the estimation region of the detection target. In the case of a small detection target such as a white cane, the estimation region may become divided or the shape may be distorted as a result of the defect noise. As a result, the subsequent shape determination becomes more difficult.

The expansion process removes the defect noise and corrects the shape distortion of the estimation region by expanding the first pixel value (white) side that indicates the detection target.

Accordingly, a small detection target such as a white cane can be more suitably detected.

(5) In the first embodiment, shape determination is performed on the region estimation image generated by the learning model 132. There are cases in which the learning model 132 may erroneously estimate an unlearned object that is not in the training data E as the detection target. However, in the first embodiment, an object having a shape different from the shape of the detection target can be excluded by shape determination of the region estimation image. Accordingly, the detection target can be detected with high accuracy. In addition, even if the training is slightly insufficient, the detection target can be detected with high accuracy.

(6) In the first embodiment, the training process of the learning model 132 is performed by using a set of a "learning image" and a "teacher image in which the detection target in the learning image is set to a first pixel value, and the remainder is set to a second pixel value" as training data. By using a teacher image divided into binary regions in this manner, it is possible to efficiently and clearly learn the detection target and other objects.

(7) Incidentally, in the convolutional neural network CNN of Non-Patent Document 1, since the image spatial features of the detection target are lost in the fully connected layer, even if the inference process inside the fully connected layer is displayed, humans are unable to interpret it.

However, in the first embodiment, since all the intermediate layers can maintain the features in the image space of the detection target, by displaying a display image based on the region estimation image on the display monitor 151, the state of the reasoning process of the learning model 132 can be visually interpreted by humans. As a result, visualization of an analysis result that facilitates the reasoning of the detection/identification result becomes possible.

(8) In the first embodiment, the person in charge modifies and sets the adjustment parameters of the imaging device 110 via the adjustment unit 148 while looking at the display monitor 151. Since this modification and setting is quickly reflected on the display image displayed on the display monitor 151, the person in charge can easily adjust the adjustment parameters of the imaging device 110 to an appropriate state while checking the display monitor 151.

(9) In the first embodiment, the person in charge modifies and sets the adjustment parameters of the video acquisition unit 120 via the adjustment unit 148 while looking at the display monitor 151. Since this modification and setting is quickly reflected on the display image displayed on the display monitor 151, the person in charge can easily adjust the adjustment parameters of the video acquisition unit 120 to an appropriate state while checking the display monitor 151.

(10) In the first embodiment, the person in charge modifies and sets the adjustment parameters of the image processing unit 140 via the adjustment unit 148 while looking at the display monitor 151. Since this modification and setting is quickly reflected on the display image displayed on the display monitor 151, the person in charge can easily adjust the adjustment parameters of the image processing unit 140 to an appropriate state while checking the display monitor 151.

(11) In the first embodiment, as illustrated in FIG. 10, all or a portion of a display image based on the region estimation image is synthesized and displayed on the display monitor 151 as a sub screen at a corresponding location of the display screen of the video acquired from the imaging device 110.

Accordingly, it is possible to easily confirm the detection state of the detection target (the white cane) together with the video of the imaging device 110.

Second Embodiment

The second embodiment is characterized in that a learning model 132a for white canes is provided.

It should be noted that the rest of the configuration and operations are the same as those of FIGS. 1 to 4 and 6 to 10 as illustrated in the first embodiment, and therefore, a repetitive description thereof will be omitted here.

<Description of the Learning Model 132a for White Canes>

FIG. 11 is a diagram illustrating two types of training data Ea and Eb used for the training process of the learning model 132a for white canes.

The training data Ea is training data composed of a set of "a learning image of a white cane possessed by a human" and "a teacher image in which the white cane of the learning image is set to a first pixel value (white) and the remainder is set to a second pixel value (black)."

By performing the training process using the training data Ea, the pixels (neurons) of the feature maps generated in the intermediate layers L1 to L4 in the learning model 132a will separate the regions of a white cane possessed by a human from the remainder. Accordingly, a learning model for estimating a region of a white cane possessed by a human is obtained.

On the other hand, the training data Eb is training data composed of a set of "a learning image of a fake object not possessed by a human" and "a teacher image in which the entirety is set to a second pixel value (black)". Here, the fake object refers to an object having image characteristics similar to the white cane, such as the white line of a road or the white pole illustrated in FIG. 11.

By performing training processing using the training data Eb, the pixels (neurons) of the feature maps generated in the intermediate layers L1 to L4 in the learning model 132a tend to no longer activate with respect to the region of fake objects not possessed by humans. Accordingly, a learning model which does not erroneously estimate the region of fake objects not possessed by humans can be obtained.

The learning unit 154 creates integrated training data in which the two types of training data Ea and Eb are integrated, and performs the training process of the learning model 132a using the integrated training data.

By performing the training process using the integrated training data including the training data Ea and Eb, the pixels (neurons) of the feature maps generated in the intermediate layers L1 to L4 in the learning model 132a separate "white canes possessed by humans," "fake objects not possessed by humans," and "other" based on relationships such as the presence or absence, location, and spacing of humans (faces, hands, torso, legs, skin color or the like).

As a result, the learning model 132a estimates the region of "white canes possessed by humans" and does not estimate "fake objects not possessed by humans" or "other" as the white cane.

Effects of the Second Embodiment

In addition to the effects of the first embodiment described above, the second embodiment has the following effects.

(1) In the second embodiment, a set in which "a teacher image in which a white cane (the detection target) possessed by a human in the learning image is set to a first pixel value and a remainder is set to a second pixel value" is associated with each of learning images including "an image of a white cane (the detection target) possessed by a human" and "an image of a fake object not possessed by a human" is used as integrated training data.

By performing the training process on the learning model 132a using the integrated training data, the learning model 132a becomes more easily activated by the features of "objects possessed by a human," such as the white cane (the detection target) while it is not activated by "fake objects not possessed by a human."

Accordingly, it is possible to suppress erroneous estimation due to "fake objects not possessed by a human" and to more accurately estimate the region of the white cane (detection target) which is an "object possessed by a human".

(2) In the case that an erroneous estimate occurs due to the appearance of a new fake object, the video frame of the fake object is stored in the recording device 152. Here, it becomes possible to expand the training data Eb for the fake object by manually or automatically collecting new video frames of the fake object. As a result, the training of the learning model 132a can be updated to cope with the appearance of new fake objects, and small detection objects such as white canes can be estimated more accurately.

Third Embodiment

The third embodiment is characterized in that a learning model 132a for white canes and a learning model 132b for fake objects are provided.

Since the learning model 132a for white canes is the same as that in the second embodiment illustrated in FIG. 11, a repetitive description thereof will be omitted here.

In addition, since the rest of the configuration is the same as those of FIGS. 1 to 4 and 6 to 10 as illustrated in the first embodiment, a repetitive description thereof will be omitted here.

<Description of Learning Model 132b for Fake Objects>

FIG. 12 is a diagram illustrating two types of training data Ec and Ed used in the training process of the learning model 132b for fake objects.

The training data Ec is training data composed of a set of "a learning image of a white cane possessed by a human" and "a teacher image in which the entirety is set to a second pixel value (black)."

By performing the training process using the training data Ec, the pixels (neurons) of the feature maps generated in the intermediate layers L1 to L4 in the learning model 132b tend to no longer activate with respect to the region of a white cane possessed by a human being. Accordingly, a learning model that intentionally does not estimate the region of a white cane possessed by a human can be obtained.

On the other hand, the training data Ed is training data composed of a set of "a learning image of a fake object not possessed by a human" and "a teacher image in which the fake object of the learning image is set to a first pixel value (white) and the remainder is set to a second pixel value (black)."

By performing the training process using the training data Ed, the pixels (neurons) of the feature maps generated in the intermediate layers L1 to L4 in the learning model 132b tend to no longer activate with respect to the region of fake objects not possessed by humans. Accordingly, a learning model which intentionally estimates the region of fake objects not possessed by humans can be obtained.

The learning unit 154 creates integrated training data in which these two types of training data Ec and Ed are integrated, and performs the training process of the learning model 132b using the integrated training data.

By performing the training process using the integrated training data including the training data Ec and Ed, the pixels (neurons) of the feature maps generated in the intermediate layers L1 to L4 in the learning model 132b separate "white canes possessed by humans," "fake objects not possessed by humans," and "other" based on relationships such as the presence or absence, location, and spacing of humans (faces, hands, torso, legs, skin color or the like). As a result, the learning model 132b for fake objects estimates the regions of "fake objects not possessed by humans" and does not perform estimation for "white canes possessed by humans."

<Operation Processing Between Region Estimation Images>

Figure 13:
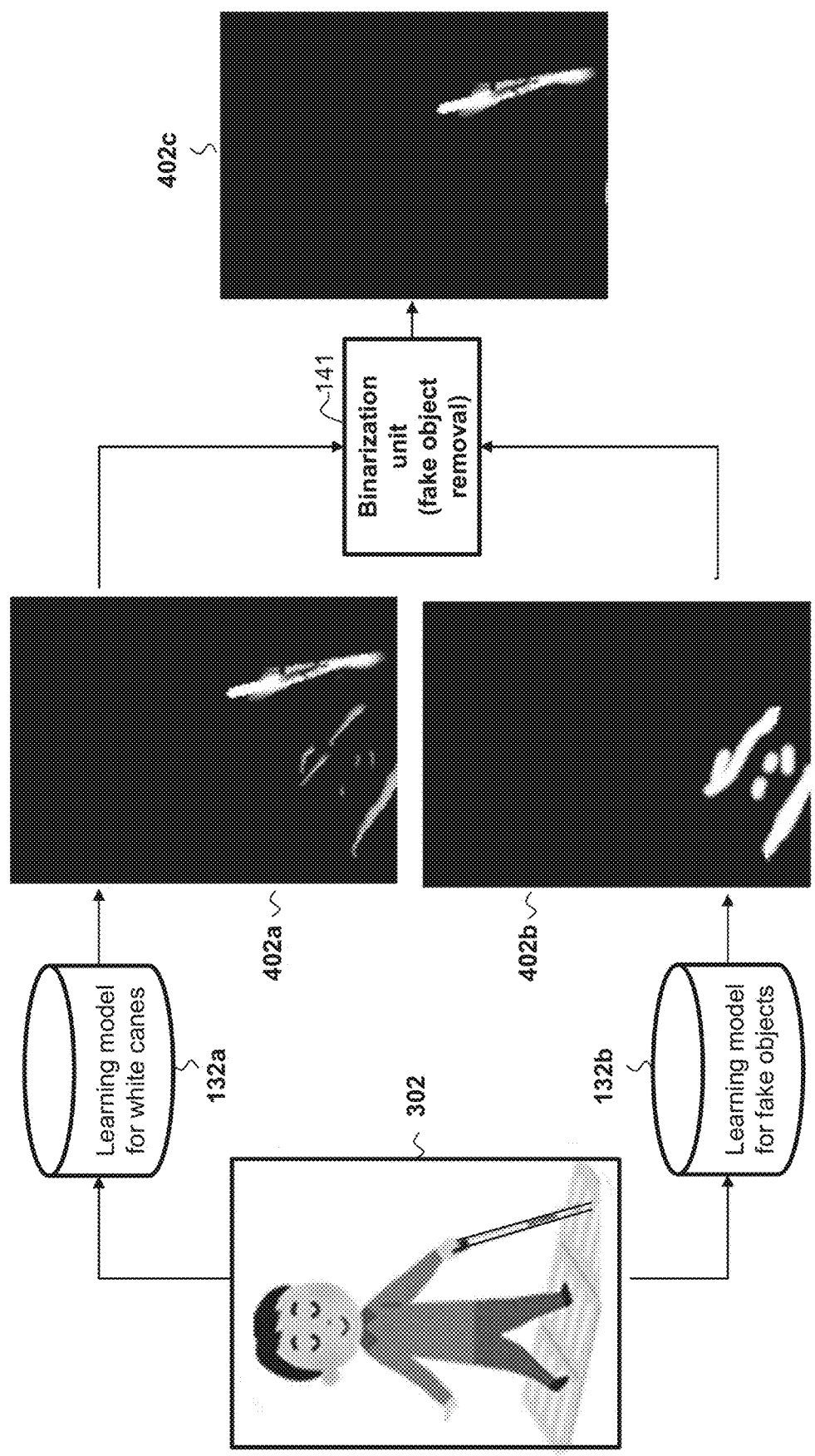
FIG. 13 is a diagram for explaining a pixel logic operation of the third embodiment.

FIG. 13 is a diagram for explaining an aspect of the region detection of the white cane according to the third embodiment.

In this figure, an input image 302 obtained by image capturing a person holding a white cane is input.

The learning model 132a for white canes processes the input image 302 to generate a white cane region estimation image 402a. This white cane region estimation image 402a includes gray noise due to fake objects.

The learning model 132b for fake objects processes the input image 302 to generate a fake object region estimation image 402b.

The binarization unit 141 performs, with respect to the two region estimation images 402a and 402b, operation processing for each corresponding pixel or region, and generates a white cane region estimation image 402c from which the false objects are removed.

For example, the binarization unit 141 subtracts the fake object region estimation image 402b from the white cane region estimation image 402a to obtain a difference image. The binarization unit 141 can generate the white cane region estimation image 402c (a binarized image) with the false objects removed by performing a binarization processing of setting the positive pixel values to a first pixel value (white) and the negative pixel values to a second pixel value (black) for the difference image.

Figure 14:
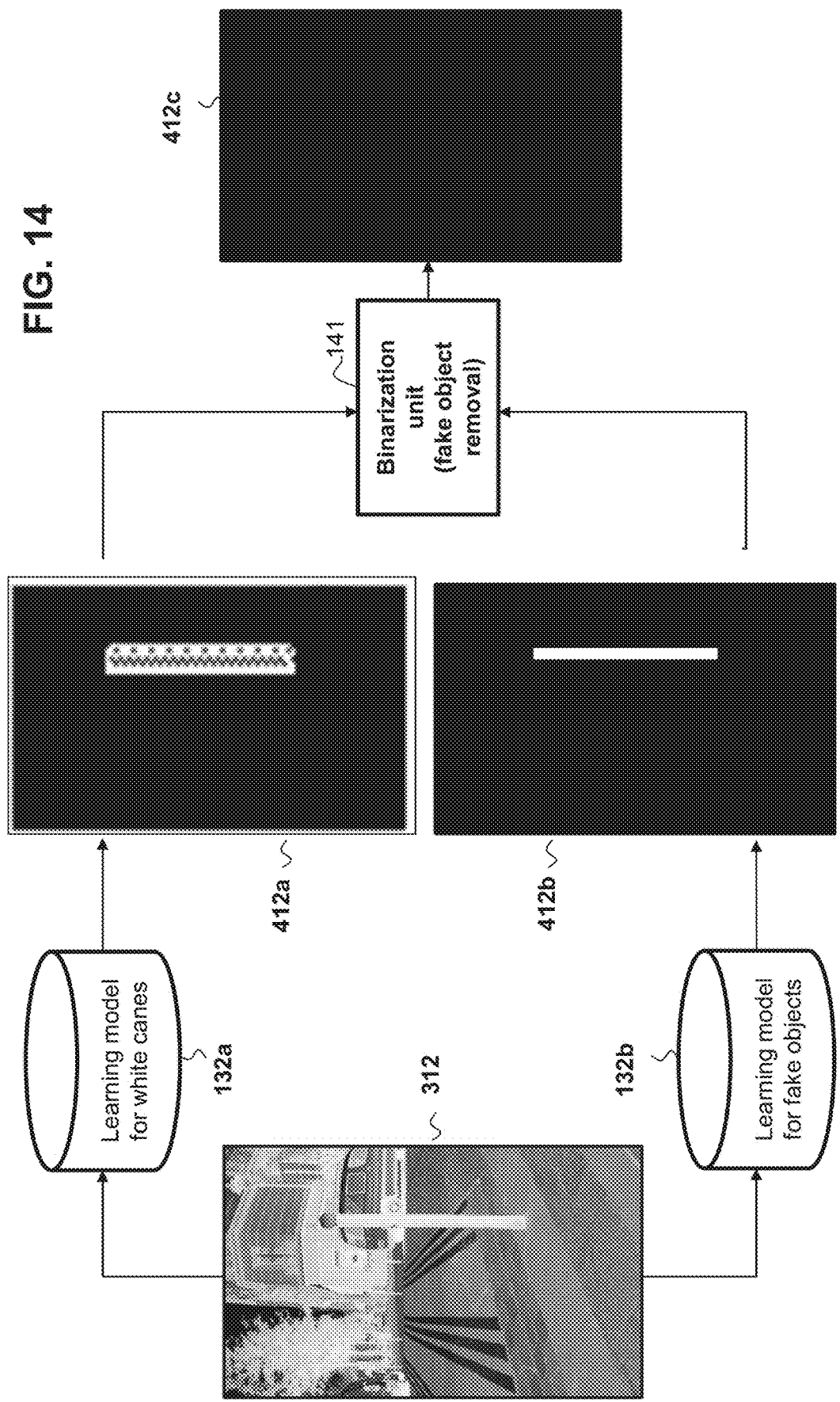
FIG. 14 is a diagram for explaining a pixel logic operation of the third embodiment.

FIG. 14 is a diagram for explaining an aspect of erroneous detection prevention in the third embodiment.

In this figure, an input image 312 obtained by image capturing a white pole as a fake object is input.

The learning model 132a for white canes processes the input image 312 to generate a white cane region estimation image 412a. The white cane region estimation image 412a includes gray noise corresponding to the white pole serving as the fake object.

The learning model 132b for fake objects processes the input image 312 to generate a fake object region estimation image 412b. In the fake object region estimation image 412b, a clear region corresponding to the white pole serving as the fake object appears.

As described above, the binarization unit 141 performs, with respect to the two region estimation images 412a and 412b, operation processing for each corresponding pixel, and thereby generates a region estimation image 412c (a binarized image) from which the erroneous detection of the false object has been removed.

Effect of the Third Embodiment (1) The third embodiment includes a learning model 132b for fake objects that estimates the fake objects from an "input image of a fake object not possessed by a human." A fake object region estimation image 402b is generated by the learning model 132b for fake objects. This fake object region estimation image 402b shows a strong correlation with the fake object noise erroneously included in the white cane region estimation image 402a.

Accordingly, the noise of the fake object included in the white cane region estimation image 402a can be reduced by using an operation process such as removing the portion correlated with the fake object region estimation image 402b. In this way, it is possible to more accurately estimate the region of small detection targets such as white canes.

(2) In the third embodiment, a set in which "a teacher image in which a fake object not possessed by a human in the learning image is set to a first pixel value and a remainder is set to a second pixel value" is associated with each of learning images including "an image of a white cane (detection target) possessed by a human" and "an image of a fake object not possessed by a human" is used as integrated training data.

By performing the training process on the learning model 132b using the integrated training data, the learning model 132b is not activated by features of "objects possessed by a human," such as the white cane (the detection target), while becoming more easily activated by features of "fake objects not possessed by a human." For this reason, it is possible to more accurately estimate the region of "fake objects not possessed by humans" without classifying the white cane (the detection target), which is an "object possessed by a human," as a fake object.

Accordingly, malfunctions in which the region of the white cane included in the white cane region estimation image 402a is erroneously removed by the operation processing with the fake object region estimation image 402b can be reduced.

As a result, small detection objects such as white canes can be estimated more accurately.

Supplementation of the Embodiments

In the embodiments described above, a case in which a white cane is used as a detection target has been described. However, detectable targets are not limited to white canes. For example, various objects such as electric poles, electric wires, signs, people, animals, buildings, vehicles, tools, components, X-rays and other objects can be used as detection targets.

In particular, in the embodiments, an item such as a white cane possessed by a human can be accurately detected. Such "detection objects possessed by humans" may include baseball bats, sports equipment such as kendo and fencing swords, as well as orchestral conducting batons and folded umbrellas.

Further, for example, in the embodiments, since the region estimation is performed while maintaining the spatial features of the image, the present invention is suitable for the detection of relatively small detection targets. These detection targets that tend to be small within the image may include shoes, hats, food, mobile phones, smartphones, components, scratches, and the like.

In addition, in the embodiments, a case in which one type of detection target is detected has been described. However, the present invention is not limited thereto. It is also possible to simultaneously detect a plurality of types of detection targets.

It should be noted that, in the embodiments, the white cane that served as the detection target in the training data was set as a first pixel value and the remainder was set as a second pixel value, but the remaining regions may be divided into a plurality of pixel values. For example, it is preferable to make various changes depending on the number and type of detection targets, such as setting a human region as a second pixel value and the background as a third pixel value. Also, the pixel values of the teacher images are not limited to brightness alone.

Further, in embodiments, the intermediate layers are specifically illustrated in FIGS. 2-4, but the present invention is not limited thereto. There are no particular restrictions on the depth (the number of layers) of the intermediate layers or the size or type of filters of the convolutional layers. In addition, with respect to the output layer, it is assumed that a number of region estimation images (or region estimation images that can be separated into the same number of multiple values) that is the same as the number of types of detection targets are output at a resolution suitable for the detection targets.

In addition, in the embodiments, the shape determination is performed by image analysis, but the present invention is not limited thereto. Shape determination may be performed by collecting various shapes of the estimation region of the detection target and using a learning model in which these shapes are machine-learned as training data.

Further, in the embodiments, binarization processing of a difference image is performed on a plurality of region estimation images, but the present invention is not limited thereto. Any operation processing may be used to remove a fake object region included in at least one of a plurality of region estimation images as noise.

In addition, in the embodiments, after the binarization unit 141 and the expansion processing unit 142 of the image processing unit 140 perform image processing on the region estimation image 402, the control unit 144 determines the presence or absence of the detection target based on the shape determination of the shape determination unit 143. However, the present invention is not limited to this, and the processing of the binarization unit 141 and the expansion processing unit 142 may not be performed, or only one of them may be performed.

It should be noted that the present invention is not limited to the above-described embodiments, and various modifications are included. For example, the above-described embodiments have been described in detail in order to explain the present invention in an easy-to-understand manner, and are not necessarily limited to include all the described configurations.

In addition, it is also possible to replace a portion of the configuration of one embodiment with the configuration of another embodiment, and it is also possible to add the configuration of one embodiment to the configuration of another embodiment.

Further, it is possible to add, delete, or replace a portion of the configuration of each embodiment.

REFERENCE SIGN LIST

100 . . . Image processing system, 110 . . . Imaging device, 120 . . . Video acquisition unit, 121 . . . Video input unit, 122 . . . Analysis region designation unit, 130 . . . Estimation unit, 131 . . . Region estimation unit, 132 . . . Learning model, 132*a* . . . Learning model for white canes, 132*b* . . . Learning model for fake objects, 140 . . . Image processing unit, 141 . . . Binarization unit, 142 . . . Expansion processing unit, 143 . . . Shape determination unit, 144 . . . Control unit, 145 . . . Display control unit, 146 . . . Recording control unit, 147 . . . Communication unit, 148 . . . Adjustment unit, 151 . . . Display monitor, 152 . . . Recording device, 153 . . . Warning device, 154 . . . Learning unit

The invention claimed is:

1. An image processing system comprising:
a video acquisition unit configured to input an input image;
an estimation unit including a Fully Convolutional Network (FCN) learning model trained, using a set of a "learning image" and a "teacher image in which a white cane in the learning image is set to a predetermined pixel value" as training data, with respect to a region of the white cane, and configured to generate a region estimation image in which the region of the white cane of the input image is brought closer to the predetermined pixel value by processing with the learning model; and
an image processing unit configured to determine a presence or absence of a white cane based on one or more of an area, a shape, or a length of a "region close to the predetermined pixel value" or a "region obtained after performing binarization processing on the region estimation image and performing binarization processing on the region close to the predetermined pixel value" in the region estimation image.

2. The image processing system according to claim 1, wherein:
the video acquisition unit:
inputs an input image-captured by an imaging device, and includes an adjustment unit configured to adjust at least one of an adjustment item of the imaging device, an adjustment item within the video acquisition unit, and an adjustment item of the image processing unit; and the image processing unit includes:
a display control unit configured to display, on a display screen, a region estimation image generated by processing of the learning model that indicates an adjustment by the adjustment unit together with a video image-captured by the imaging device.

3. The image processing system according to claim 2, wherein:
the display control unit is further configured to synthesize and display the region estimation image in which the adjustment is indicated at a corresponding position of the region estimation image in the input image image-captured by the imaging device.

4. An image processing program for causing an image processing apparatus to function as the video acquisition unit, the estimation unit, and the image processing unit according to claim 1.

5. An image processing system comprising:
a video acquisition unit configured to input an input image;
an estimation unit including a Fully Convolutional Network (FCN) learning model trained with respect to a region of a predetermined detection target, and configured to generate a region estimation image for the detection target by processing the input image with the learning model; and
an image processing unit configured to determine a presence or absence of the detection target by shape determination based on the region estimation image.

6. The image processing system according to claim 5, wherein:
the estimation unit is further configured to:
perform region estimation of the detection target possessed by a human in the input image while suppressing estimation errors resulting from fake objects not possessed by humans.

7. The image processing system according to claim 5, wherein:
the estimation unit includes the learning model trained using, as training data, a set in which a "teacher image in which the detection target possessed by a human in the learning image is set to a first pixel value and a remainder is set to a second pixel value" is associated with each of learning images including "an image of the detection target possessed by a human" and "an image of the fake object not possessed by a human."

8. The image processing system according to claim 5, wherein:
the estimation unit further includes, as the learning model:
a learning model for the detection target configured to perform region estimation of the detection target from an "input image of the detection target possessed by a human," and
a learning model for fake objects configured to perform region estimation of a fake object from an "input image of a fake object not possessed by a human," and
the estimation unit is further configured to:
generate, by processing the input image with the learning model for the detection target, a region estimation image for the detection target,
generate, by processing the input image with the learning model for fake objects, a region estimation image for the fake object, and
perform operation processing with respect to the region estimation image for the detection target and the region estimation image for the fake object, and perform region estimation for the detection target in which estimation error of the fake object is suppressed.

9. The image processing system according to claim 5, wherein:
in the estimation unit,
the detection target is a white cane; and
the image processing unit is configured to:
determine that a white cane has been detected if at least one of:
an area of a region corrected by binarization processing of the region estimation image matches an allowable range of an area of a white cane,
a height and width and aspect ratio of the region match an allowable range of a height, a width, and an aspect ratio of the white cane,
a maximum width, a minimum width, and a flatness thereof match an allowable range of a maximum width, a minimum width, and a flatness thereof for the white cane, or
a length of a maximum straight line contained in the region matches an allowable range of a length of a straight line of the white cane on a screen.

10. An image processing program for causing an image processing apparatus to function as the video acquisition unit, the estimation unit, and the image processing unit according to claim 5.

11. The image processing system according to claim 5, wherein:
the video acquisition unit:
inputs an input image-captured by an imaging device, and includes an adjustment unit configured to adjust at least one of an adjustment item of the imaging device, an adjustment item within the video acquisition unit, and an adjustment item of the image processing unit; and
the image processing unit includes:
a display control unit configured to display, on a display screen, a region estimation image generated by processing of the learning model that indicates an adjustment by the adjustment unit together with a video image-captured by the imaging device.

12. The image processing system according to claim 11, wherein:
the display control unit is further configured to synthesize and display the region estimation image in which the adjustment is indicated at a corresponding position of the region estimation image in the input image image-captured by the imaging device.

13. An image processing method comprising:
a video acquisition step of inputting an input image;
an estimation step of including a Fully Convolutional Network (FCN) learning model trained, using a set of a "learning image" and a "teacher image in which a white cane in the learning image is set to a predetermined pixel value" as training data, with respect to a region of the white cane, and generating a region estimation image in which the region of the white cane of the input image is brought closer to the predetermined pixel value by processing with the learning model; and
an image processing step of determining a presence or absence of a white cane based on one or more of an area, a shape, or a length of a "region close to the predetermined pixel value" or a "region obtained after performing binarization processing on the region estimation image and performing binarization processing on the region close to the predetermined pixel value" in the region estimation image.

14. An image processing method comprising:
a video acquisition step of inputting an input image;
an estimation step of using a Fully Convolutional Network (FCN) learning model trained with respect to a region of a predetermined detection target, and generating a region estimation image for the detection target by processing the input image with the learning model; and
an image processing step of determining a presence or absence of the detection target by shape determination based on the region estimation image.

* * * * *